United States Patent Office 2,735,845
Patented Feb. 21, 1956

2,735,845
AZO DYESTUFFS

Hans Ruckstuhl, Otto Senn, and Walter Wehrli, Basel, Switzerland, assignors to Sandoz A. G., Basel, Switzerland, a Swiss firm No Drawing. Application February 28, 1951,
Serial No. 213,303

Claims priority, application Switzerland March 2, 1950

6 Claims. (Cl. 260—200)

The present invention relates to new azo compounds which are in part useful dyestuffs themselves and which are endowed with a remarkable coupling energy whereby they are particularly useful for the production of new disazo and polyazo dyestuffs as a result of the ease with which they may be coupled with further diazo or diazoazo compounds, respectively.

The new azo compounds according to the present invention are prepared by substituting an OH group for the amino group in azo dyestuffs obtained by acid coupling and corresponding to the formula $$R_1-N=N-R_2$$

wherein $R_1$ stands for the 2-amino-5-hydroxynaphthalene-7-sulfonic radical or the 1-amino-7-hydroxynaphthalene-3- or 4-sulfonic acid radical, and $R_2$ stands for a substituted or unsubstituted benzene or arylazobenzene radical, by subjecting the starting dyestuffs to the action of a caustic-alkaline to mineral-acid medium, with or without the use of elevated temperature, elevated pressure and with or without the addition of salts of nitrous acid.

The azo dyestuffs serving as starting materials for the present invention are prepared by acid coupling of diazotized amines of the composition

wherein $R_2$ has the previously-recited significance, with 2 - amino - 5 - hydroxy - naphthalene - 7 - sulfonic acid or 1-amino-7-hydroxynaphthalene-3-sulfonic acid or 1-amino-7-hydroxynaphthalene-4-sulfonic acid, and correspond respectively to the formulae

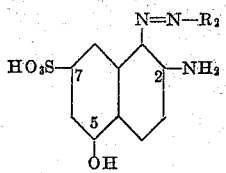

and

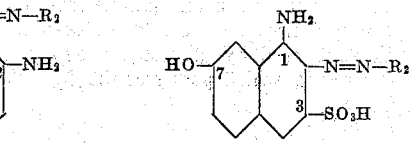

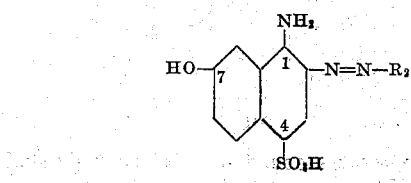

The substituents on the $R_2$ residue may vary widely and may, for example, be —COOH, —COO.alkyl, —SO$_3$H, —SO$_2$NH$_2$ as well as alkyl-, aralkyl-, aryl- or acyl-substituted sulf-amido groups, —NO$_2$, —NH$_2$ as well as alkyl-, aralkyl-, aryl- or acyl-substituted amino groups, —O-alkyl, —O-aralkyl, O-aryl, halogen, —CN, —CF$_3$, —N=N-aryl and other substituents.

The replacement of the amino group by the hydroxyl group can, in neutral to caustic-alkaline medium, be carried out in a wide variety of ways. In some cases, simple heating of the aqueous solution of the dyestuff under reflux suffices to effect the desired replacement; in other cases, heating for several hours to temperatures of, for instance, 140°–150° in an autoclave is necessary.

In acid medium, the aforesaid replacement can also be realized in wide variety of ways. In some cases, heating for a brief period of time with dilute mineral acid is sufficient to achieve the replacement; in other cases, prolonged heating under reflux is required. A particularly smooth replacement is frequently realized by treatment with nitrous acid at room temperature. In some cases, concentrated mineral acid or organic acid, with or without the addition of nitrites, yields good results.

As previously indicated, the new derivatives of the present invention are themselves useful azo dyestuffs or, as a result of their remarkable coupling energy are very useful intermediates for the preparation of new disazo and polyazo dyestuffs, including metallizable products which are particularly interesting.

The following examples further illustrate the invention without, however, being limitative thereof. Parts and percentages are by weight; temperatures are in degrees centigrade.

EXAMPLE 1

50.3 parts of the sodium salt of the dyestuff, coupled in mineral acid solution, from diazobenzene-2,5-disulfonic acid and 2-amino-5-hydroxynaphthalene-7-sulfonic acid are boiled under reflux for 4 hours in 2500 parts of water. The reaction product, which is in solution with brown-red coloration, is salted out under acid conditions and separated by filtration. It is a brown-red powder which dissolves in concentrated sulfuric acid with bluish red coloration. It corresponds to the formula

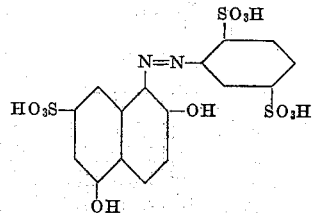

EXAMPLE 2

38.7 parts of the dyestuff obtained from 1-diazobenzene-2-carboxylic acid by acid coupling with 2-amino-5-hydroxynaphthalene-7-sulfonic acid are heated for 8 hours to 140–150° with 1500 parts of 2.5% aqueous caustic soda solution in an autoclave. This operation results in complete replacement of the amino group by the hydroxyl group. The dyestuff, isolated by salting out and filtration, is a brown-red powder which dissolves in concentrated sulfuric acid with bluish red coloration. It corresponds to the formula

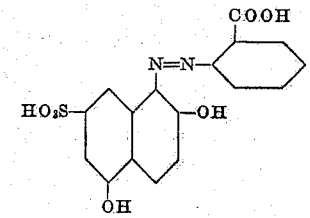

It can be coupled for instance with the diazo compound of the disazo dyestuff corresponding to the formula

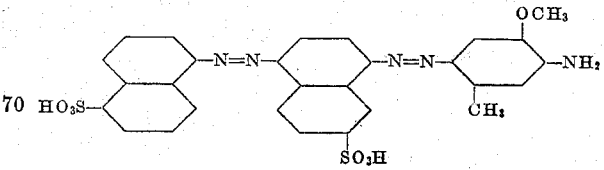

A trisazo dyestuff results, the copper complex compound of which dyes cotton in grey shades.

EXAMPLE 3

45 parts of the dyestuff obtained from 2-diazo-1-methoxybenzene-4-sulfonic acid by acid coupling with 2-amino-5-hydroxynaphthalene-7-sulfonic acid are heated for 15 hours to 140–150° with 1500 parts of 2.5% aqueous caustic soda solution in an autoclave whereby complete replacement of the amino group by the hydroxyl group takes place. The resultant dyestuff, isolated by salting out and filtration, is a dark powder which dissolved in concentrated sulfuric acid with blue-red coloration. It corresponds to the formula

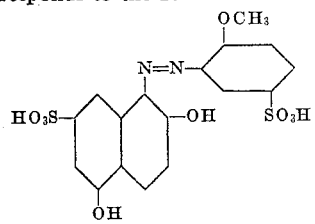

EXAMPLE 4

50.3 parts of the sodium salt of the dyestuff coupled in strong acetic acid solution, from diazobenzene-2,5-disulfonic acid and 1-amino-7-hydroxynaphthalene-3-sulfonic acid are heated under reflux for 4 hours in 100 parts of a 2% aqueous caustic soda solution. The reaction mass is then acidified with hydrochloric acid and the dyestuff precipitated with common salt. It is a brown powder which dissolves in water and in concentrated sulfuric acid with red-brown coloration. It corresponds to the formula

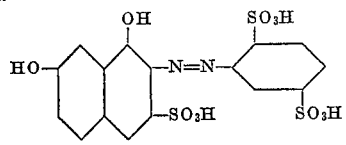

EXAMPLE 5

46.7 parts of the dyestuff obtained from 1-carboxy-2-diazobenzene-4-sulfonic acid and 1-amino-7-hydroxy-naphthalene-3-sulfonic acid in acetic acid solution are heated for 2 hours to 140–150° in 500 parts of 2% aqueous caustic soda solution. The dyestuff separated by salting out and filtration, is a red powder which dissolves in water with reddish coloration and in concentrated sulfuric acid with brown-red coloration. It corresponds to the formula

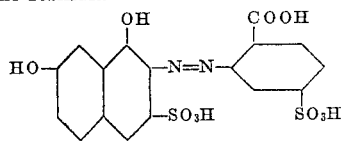

EXAMPLE 6

43.2 parts of the dyestuff obtained from 5-nitro-2-diazobenzene-1-carboxylic acid by acid coupling with 2-amino-5-hydroxynaphthalene-7-sulfonic acid are dissolved neutral in 700 parts of water with the calculated amount of aqueous caustic soda solution. The solution is boiled under reflux for 48 hours with 35 parts of concentrated hydrochloric acid. The amino group is thereupon completely replaced by the hydroxyl group. The new dyestuff, corresponding to the formula

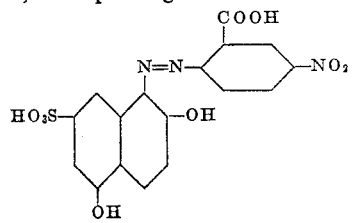

is isolated by direct filtration and is converted into the sodium salt which, in dried state, is a dark brown powder which dissolves in concentrated sulfuric acid with reddish blue coloration.

It can easily be coupled with f. i. the intermediate obtained by alkaline coupling 2 mols of tetrazotized 3.3'-dimethoxy-4.4'-diamino-diphenyl with 1 mol of the sodium salt of 1-hydroxynaphthalene-3.8-disulfonic acid; a trisazo dyestuff is obtained, the copper complex compound of which dyes cotton in navy blue shades of good fastness properties.

The dyestuff obtained from 4-nitro-2-diazobenzene-1-carboxylic acid by acid coupling with 2-amino-5-hydroxynaphthalene-7-sulfonic acid is converted, by proceeding precisely analogously to the description set forth in the preceding paragraph, into the corresponding dihydroxy-naphthalene sulfonic acid dyestuff of the formula

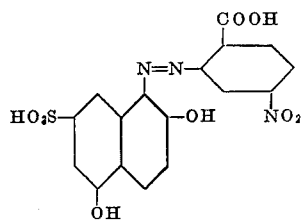

EXAMPLE 7

46.7 parts of the dyestuff obtained from 1-carboxy-2-diazobenzene-4-sulfonic acid by acid coupling with 2-amino-5-hydroxynaphthalene-7-sulfonic acid are boiled under reflux for 2 hours in 700 parts of water to which 35 parts of concentrated hydrochloric acid have been added. The new dyestuff, which corresponds to the formula

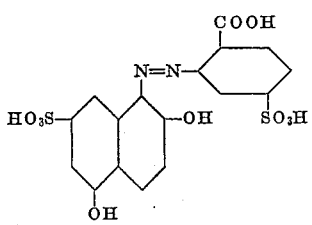

is isolated by salting out and filtration. Dried, it is a brown-red powder which dissolves in concentrated sulfuric acid with reddish blue coloration.

If it is coupled in an alkaline medium with 1-diazo-2-methoxy-4-nitrobenzene and the so-obtained disazo dyestuff condensed by glucose, an azoxy dyestuff of great value results which possesses the formula

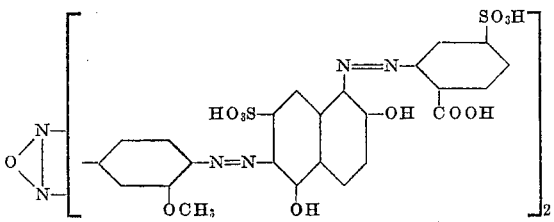

The copper complex compound of this azoxy dyestuff dyes cotton in bluish grey shades of good fastness properties.

EXAMPLE 8

46.7 parts of the dyestuff obtained from 1-carboxy-2-diazobenzene-5-sulfonic acid by acid coupling with 2-amino-5-hydroxynaphthalene-7-sulfonic acid are boiled under reflux for 4 hours in 500 parts of water containing 30 parts of concentrated hydrochloric acid. The new dyestuff is precipitated with salt and is isolated by filtration. In dried state, it is a red-brown powder which dissolves in concentrated sulfuric acid with reddish blue coloration. It corresponds to the formula

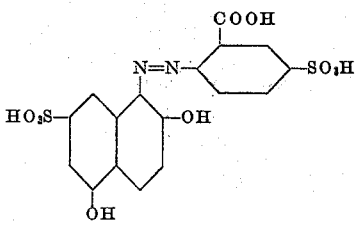

EXAMPLE 9

57.1 parts of the dyestuff obtained from 3'-carboxy-4'-diazo-1,1'azobenzene-4-sulfonic acid by acid coupling with 2-amino-5-hydroxy-naphthalene-7-sulfonic acid are dissolved neutral in 1000 parts of water with the calculated quantity of aqueous caustic soda solution. The solution is boiled under reflux for 3 hours with 60 parts of concentrated hydrochloric acid, and the formed acid-sensitive dihydroxynaphthalene sulfonic acid dyestuff of the formula

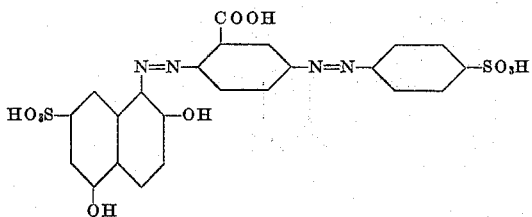

immediately salted out and isolated by filtration. The product is a dark powder which dissolves in concentrated sulfuric acid with bluish green coloration.

EXAMPLE 10

57.1 parts of the dyestuff obtained from 3'-carboxy-4'-diazo-1,1'-azobenzene-4-sulfonic acid by acid coupling with 2-amino-5-hydroxynaphthalene-7-sulfonic acid are dissolved in 2000 parts of water weakly alkaline with 14 parts of caustic soda. 6.9 parts of sodium nitrite are then added to the solution, and then the resultant mass is allowed to flow at 15° into a mixture of 60 parts of concentrated hydrochloric acid and 120 parts of water. The mixture is stirred for about 30 hours at room temperature, whereupon the formed dyestuff is present wholly as the dihydroxynaphthalenesulfonic acid of the formula set forth in Example 9. The dyestuff, which is in part already present in crystalline form, is completely isolated by salting out hot, followed by filtration.

EXAMPLE 11

43.1 parts of the dyestuff obtained from 2-diazobenzene-1.4-dicarboxylic acid by acid coupling with 2-amino-5-hydroxynaphthalene-7-sulfonic acid are dissolved in 2000 parts of water made weakly alkaline with 14 parts of caustic soda. 6.9 parts of sodium nitrite are added to the solution, and the mixture is then allowed to run at 15° into 60 parts of concentrated hydrochloric acid diluted with 120 parts of water. After stirring for about 24 hours, the reaction mass is rendered weakly alkaline with sodium carbonate, and the new dyestuff of the formula

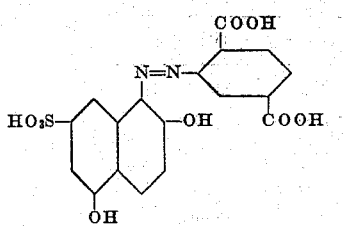

is isolated by salting out. In dried state, it is a dark-brown powder which dissolves in concentrated sulfuric acid with reddish blue coloration.

The dyestuff obtained from 2-diazobenzene-1.5-dicarboxylic acid by acid coupling with 2-amino-5-hydroxynaphthalene-7-sulfonic acid is converted, according to the prescriptions of the preceding paragraph, into the corresponding dihydroxynaphthalenesulfonic acid dyestuff of the formula

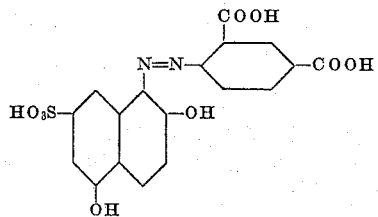

EXAMPLE 12

49.8 parts of the dyestuff obtained from 5-nitro-2-diazo-1-methoxy-benzene-4-sulfonic acid by acid coupling with 2-amino-5-hydroxynaphthalene-7-sulfonic acid are dissolved in 3000 parts of water made weakly alkaline with 10 parts of caustic soda, 6.9 parts of sodium nitrite added to the solution, and the resultant mixture allowed to flow at 15° into 180 parts of 10% aqueous hydrochloric acid. After stirring the reaction mass for about 24 hours at room temperature, the new dyestuff of the formula

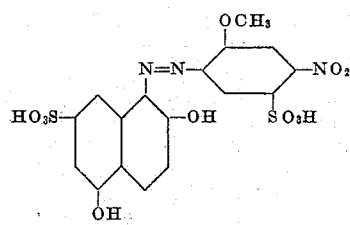

is isolated. In dried state, it is a dark-brown powder which dissolves in concentrated sulfuric acid with reddish blue coloration.

EXAMPLE 13

43.2 parts of the dyestuff obtained from 5-nitro-2-diazobenzene-1-carboxylic acid by acid coupling with 1-amino-7-hydroxynaphthalene-4-sulfonic acid are dissolved neutral in 3000 parts of water containing 8 parts of caustic soda. 150 parts of concentrated hydrochloric acid are added to the solution which is then heated to about 95°. After about 1 hour, the dyestuff is entirely dissolved and the desired replacement of the amino group by OH is entirely achieved. The new dyestuff which corresponds to the formula

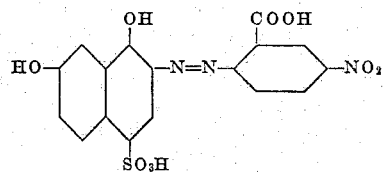

is salted out hot and is filtered. After being dried, it is a dark-brown powder which dissolves in concentrated sulfuric acid with cherry-red coloration.

EXAMPLE 14

46.7 parts of the dyestuff obtained from 1-carboxy-2-diazobenzene-4-sulfonic acid by acid coupling with 1-amino-7-hydroxynaphthalene-3-sulfonic acid are dissolved in 1400 parts of boiling water, and the solution rendered acid by the dropwise addition of 50 parts of concentrated hydrochloric acid. After boiling for a short time, the formed precipitate goes completely into solution. The solution is rendered alkaline with caustic soda solution and the dyestuff is precipitated with common salt. The dyestuff, after being isolated and dried, is a red powder which dissolves in water with a red coloration and in concentrated sulfuric acid with a brown-red coloration. It corresponds to the formula

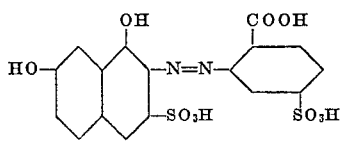

EXAMPLE 15

45 parts of the dyestuff obtained by coupling 2-diazo-1-methoxy-benzene-4-sulfonic acid with 1-amino-7-hydroxynaphthalene-3-sulfonic acid in acetic acid solution are dissolved in 1400 parts of water and after addition of 50 parts of concentrated hydrochloric acid are boiled under reflux for 12 hours. By isolation of the dyestuff as the sodium salt, it is obtained as a dark-brown powder which dissolves in water with yellow-red coloration and in concentrated sulfuric acid with blue-red coloration. The dyestuff corresponds to the formula

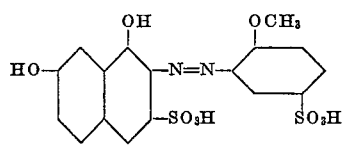

EXAMPLE 16

50.3 parts of the sodium salt of the dyestuff, coupled in strongly acetic acid solution, from diazobenzene-2,5-disulfonic acid and 1-amino-7-hydroxynaphthalene-3-sulfonic acid are boiled under reflux for 2 to 3 hours in 1400 parts of water to which 50 parts of concentrated hydrochloric acid have been added, until complete dissolution has taken place. The dyestuff obtained by salting out is a dark powder which dissolves in water and in concentrated sulfuric acid with red-brown coloration. It corresponds to the formula

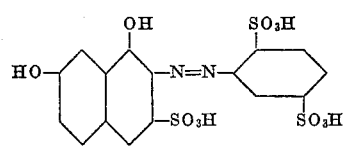

The following table sets forth, by way of further illustration of the invention, an additional number of examples in terms of the diazo and coupling components of the amino-dyestuffs and of the formulae of the corresponding dihydroxy-dyestuffs derived therefrom by proceeding according to the procedures set forth in the preceding examples; the color of the respective solutions in concentrated sulfuric acid before and after the replacement of the amino group by the hydroxy group is also indicated.

The formulae of the respective dihydroxynaphthalene sulfonic acid dyestuffs of the preceding table are:

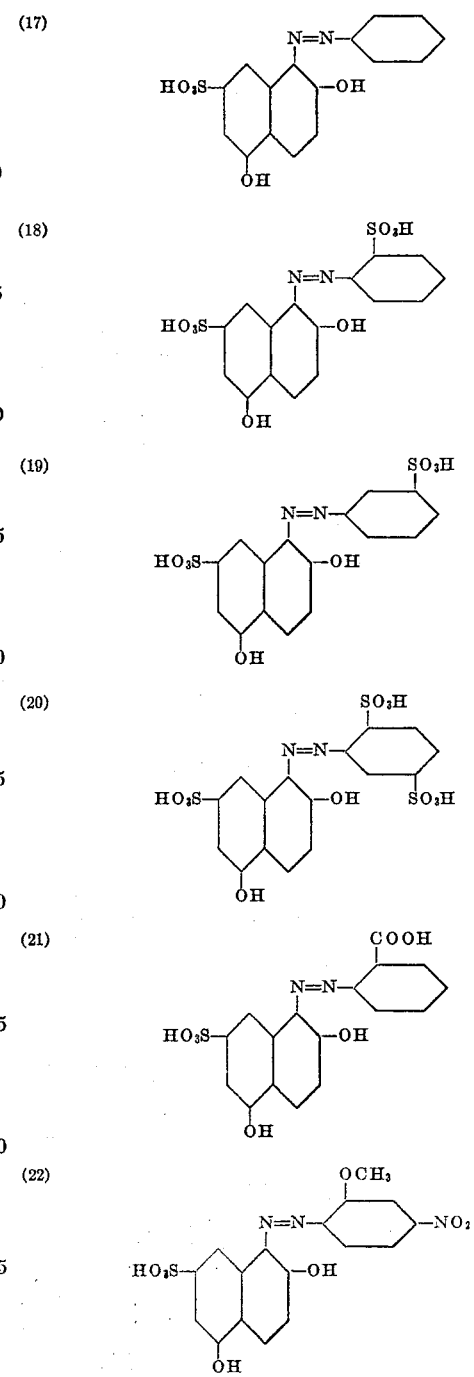

Table

|  | Diazo Component | Coupling Component | Solution Color in Con. Sulfuric Acid | |
|---|---|---|---|---|
|  |  |  | $NH_2$-Dyestuff | OH-Dyestuff |
| 17 | 1-aminobenzene | 2-amino-5-hydroxynaphthalene-7-sulfonic acid. | reddish blue | bluish red. |
| 18 | 1-aminobenzene-2-sulfonic acid | ___do___ | yellowish green | Do. |
| 19 | 1-aminobenzene-3-sulfonic aicd | ___do___ | bluish green | Do. |
| 20 | 1-aminobenzene-2,5-disulfonic acid | ___do___ | yellowish red | Do. |
| 21 | 1-aminobenzene-2-carboxylic acid | ___do___ | bluish green | Do. |
| 22 | 5-nitro-2-amino-1-methoxybenzene. | ___do___ | blue | reddish blue. |
| 23 | 5-chloro-2-aminobenzene-1-carboxylic acid. | ___do___ | green | reddish violet. |

(23)

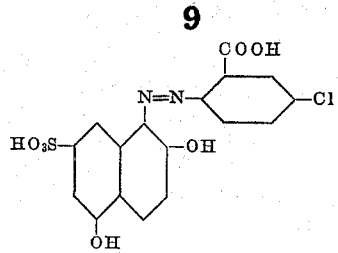

Having thus disclosed the invention what is claimed is:

1. A dyestuff derivative of the formula

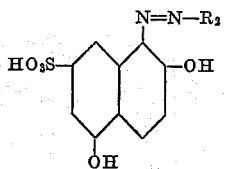

wherein $R_2$ stands for a mononuclear aryl radical of the benzene series.

2. A dyestuff derivative of the formula

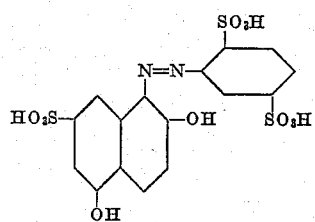

3. A dyestuff derivative of the formula

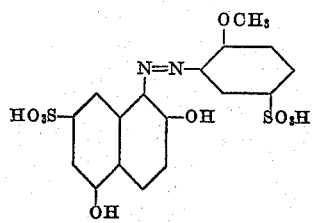

4. A dyestuff derivative of the formula

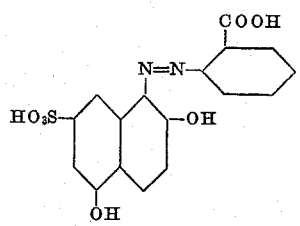

5. A dyestuff derivative of the formula

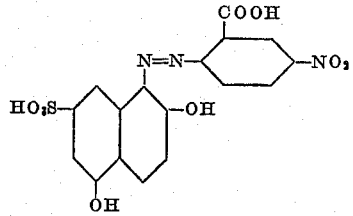

6. A dyestuff derivative of the formula

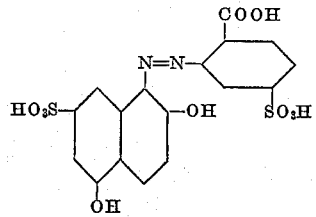

References Cited in the file of this patent

UNITED STATES PATENTS

| | | |
|---|---|---|
| Re. 11,308 | Ulrich | Feb. 21, 1893 |
| 468,142 | Ulrich | Feb. 2, 1892 |
| 1,823,943 | Kalischer | Sept. 22, 1931 |
| 2,418,416 | Locke | Apr. 1, 1947 |
| 2,576,768 | Anderau | Nov. 27, 1951 |
| 2,620,332 | Widmer | Dec. 2, 1952 |

OTHER REFERENCES

Zollinger: Helvetica Chemica Acta, vol. 23 (1950), No. 111, pg. 542.